Aug. 31, 1965   M. D. PRINCE   3,203,236
FLUID FLOW INDICATOR
Filed Aug. 31, 1962   4 Sheets-Sheet 1
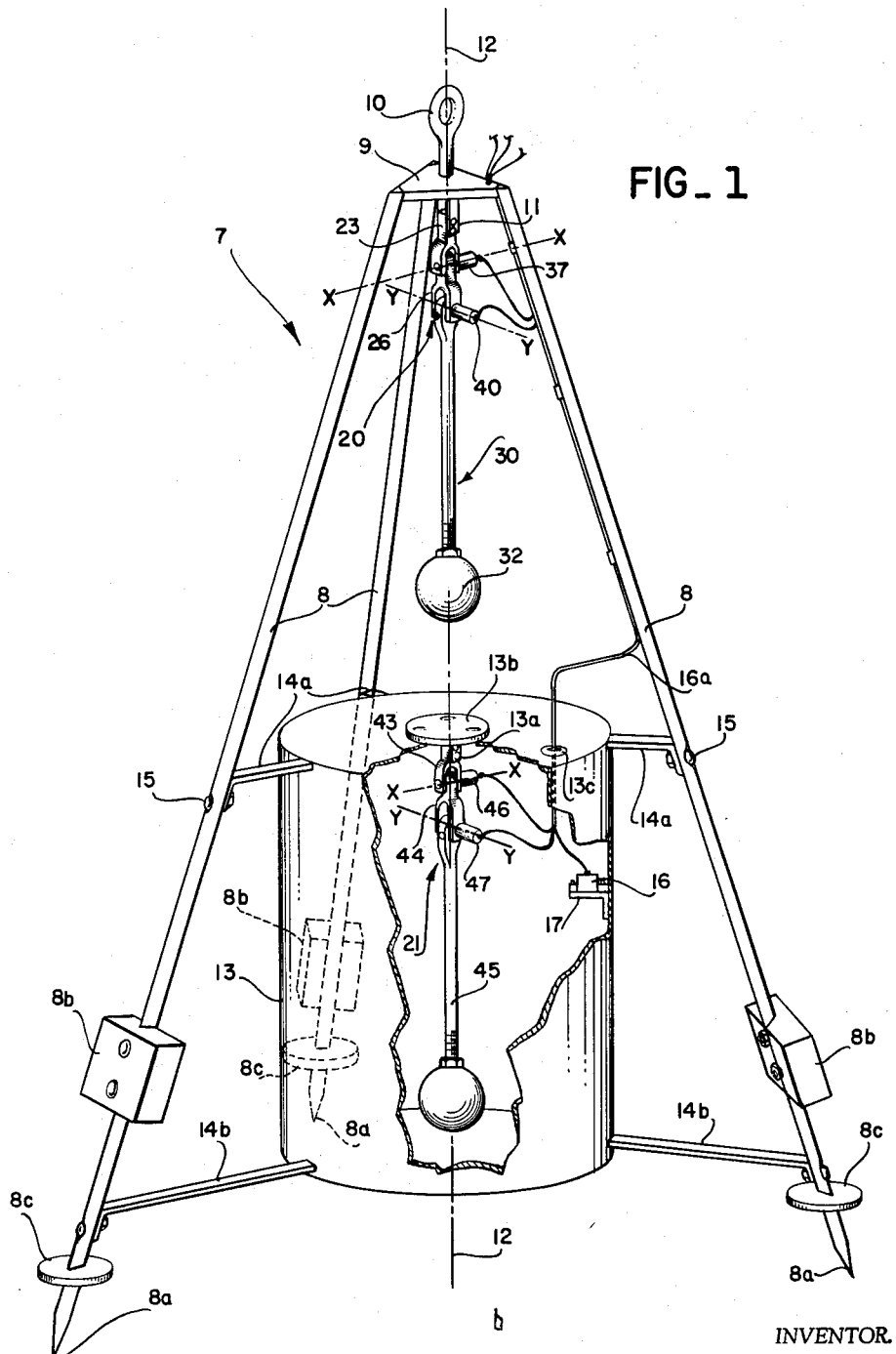
FIG_1
INVENTOR.
MORRIS D. PRINCE
BY
*George C. Sullivan*
Agent

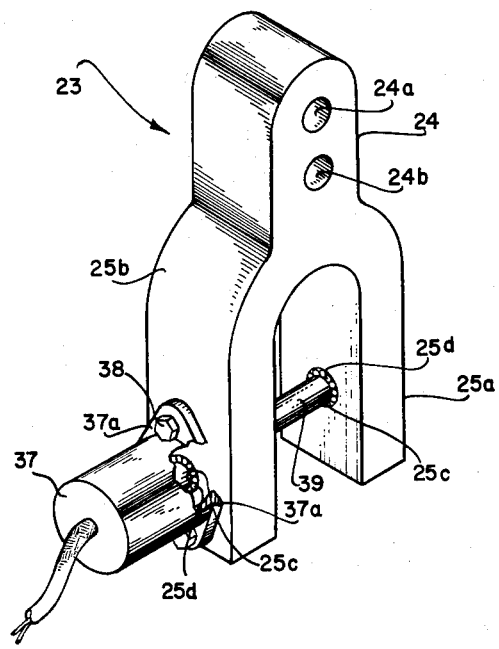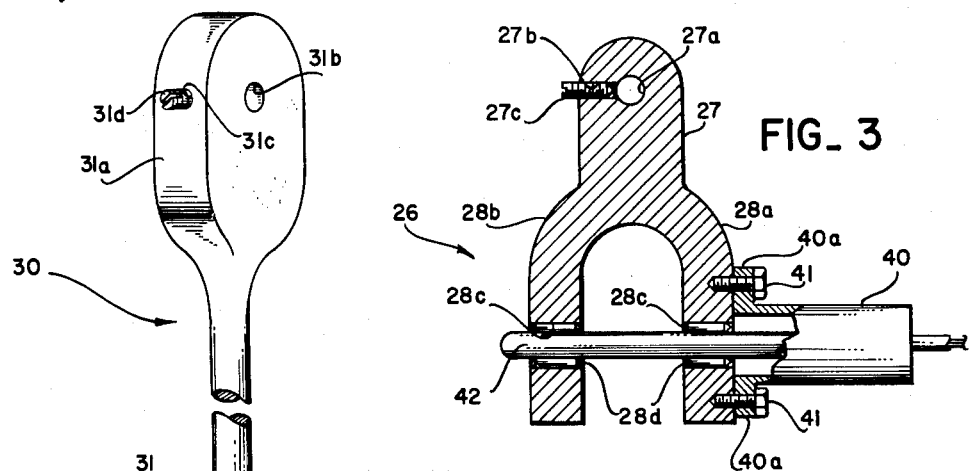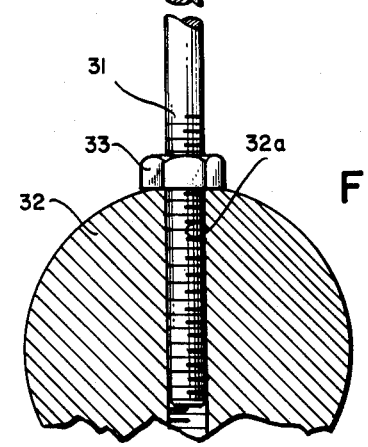

Aug. 31, 1965  M. D. PRINCE  3,203,236
FLUID FLOW INDICATOR
Filed Aug. 31, 1962  4 Sheets-Sheet 4
FIG_6
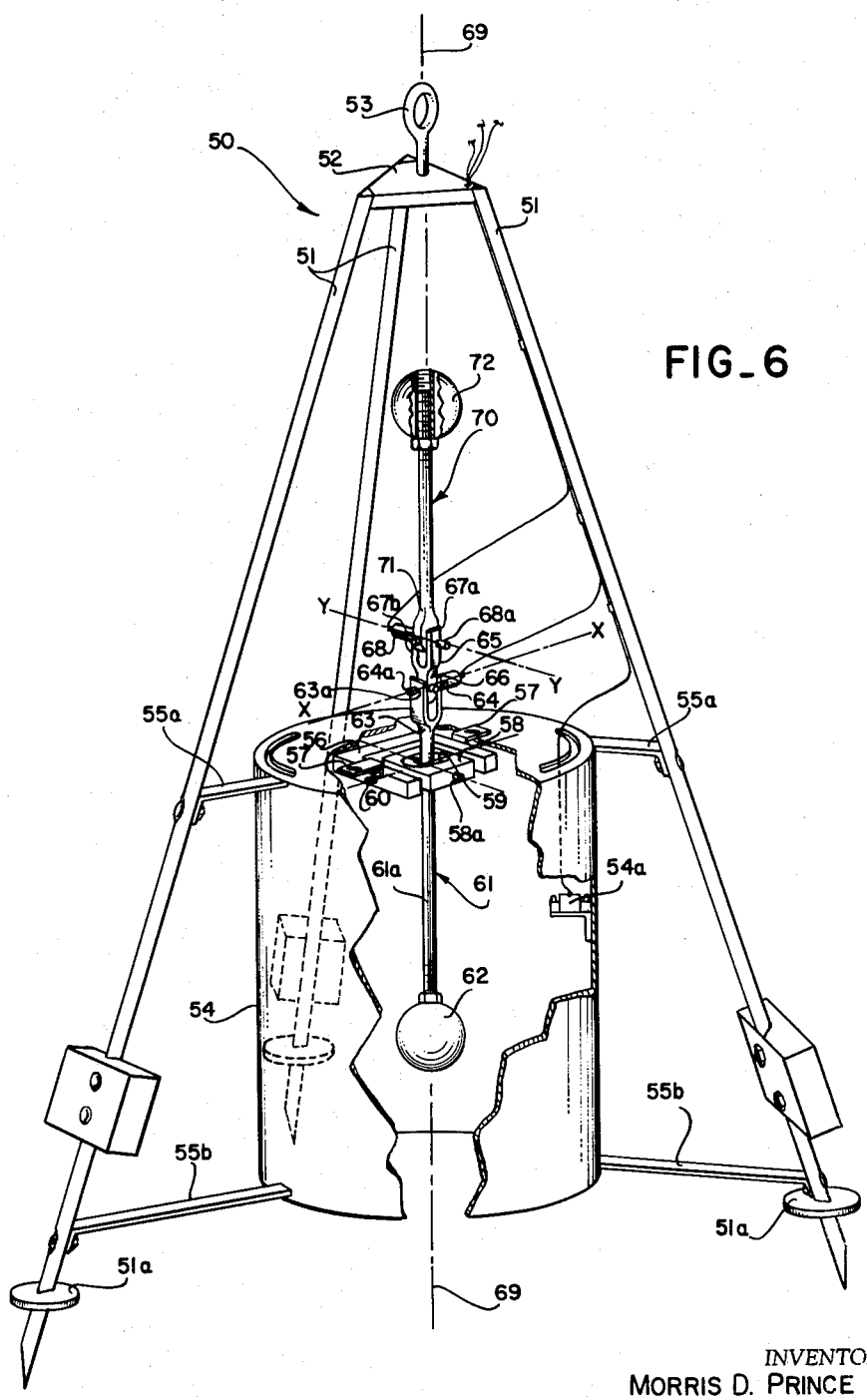
INVENTOR.
MORRIS D. PRINCE
BY
*George C. Sullivan*
Agent

United States Patent Office 3,203,236
Patented Aug. 31, 1965

3,203,236
FLUID FLOW INDICATOR
Morris D. Prince, Atlanta, Ga., assignor to Lockheed Aircraft Corporation, Burbank, Calif.
Filed Aug. 31, 1962, Ser. No. 221,006
6 Claims. (Cl. 73—189)

This invention relates to an indicator for determining the flow of fluids, and more particularly to a fluid direction and velocity indicator particularly adapted for blind emplacement having automatic data transmission characteristics.

Heretofore, the measurement of the velocity and direction of fluid flow has been accomplished by various apparatus which must be precisely positioned or oriented for reliable data to be obtained. Such prior art devices require complex mechanisms or systems and for the most part are somewhat insensitive to variations in the direction and velocity of fluid flow, particularly at low velocities. For example, in the measurement of low velocity ocean currents, the tethering of a floating balloon underwater and the periodic photographing of the displacement of the balloon relative to a datum has been resorted to in order to obtain records of variations in the velocity and direction of the ocean currents. The disadvantages and limitations of such prior art devices are eliminated in accordance with this invention.

It is therefore an object of this invention to provide a fluid flow indicator capable of blind emplacement.

It is another object of this invention to provide a fluid flow indicator having automatic data transmission characteristics.

Still another object of this invention is to provide a fluid stream direction and velocity indicator particularly adapted for use in the measurement of the direction and velocity of a very low velocity fluid stream.

A further object of this invention is to provide a fluid stream direction and velocity indicator including a pendulum means having two degrees of freedom and apparatus for indicating the deflection of the pendulum in response to the impingement of fluid thereon.

A further object of this invention is to provide a pendulum having two degrees of freedom, means providing a vertical reference for the pendulum, and apparatus for indicating the displacement of the pendulum with respect to the vertical reference in response to the impingement of fluid thereon.

Still another object of this invention is to provide a first pendulum exposed to the fluid flow having two degrees of freedom, a second pendulum shielded from the fluid flow having two degrees of freedom, and apparatus for indicating the displacement of the first pendulum with respect to the second pendulum.

A further object of this invention is to provide a floatable pendulum having two degrees of freedom, a vertical reference for the pendulum, and apparatus for indicating the deflection of the pendulum with respect to the vertical reference in response to the impingement of fluid thereon.

Another object of this invention is to provide a pendulum assembly including a floatable pendulum having two degrees of freedom, apparatus for indicating the deflection of the floatable pendulum in response to the impingement of fluid thereon, and means for mounting the pendulum assembly with two degrees of freedom with respect to vertical.

Still a further object of this invention is to provide a fluid direction and velocity indicator including a pendulum having two degrees of freedom, apparatus providing a vertical reference for the pendulum, apparatus for indicating the deflection of the pendulum with respect to the vertical reference in response to the impingement of fluid thereon, and apparatus indicating north orientation of the indicator.

Other objects and advantages will become apparent from the following description taken in connection with the accompanying drawings in which:

FIGURE 1 is a partially cut away pictorial view of a preferred embodiment of the indicator of this invention;

FIGURE 2 is a pictorial view of a connector member which is a component of the indicator of FIGURE 1;

FIGURE 3 is a partially sectional side view of another connector member which is a component of the indicator of FIGURE 1;

FIGURE 4 is a partially sectional side view of a pendulum which is a component of the indicator of FIGURE 1;

FIGURE 6 is a pictorial view, partially in section, of an alternate embodiment of the indicator of FIGURE 1.

Figure 5:
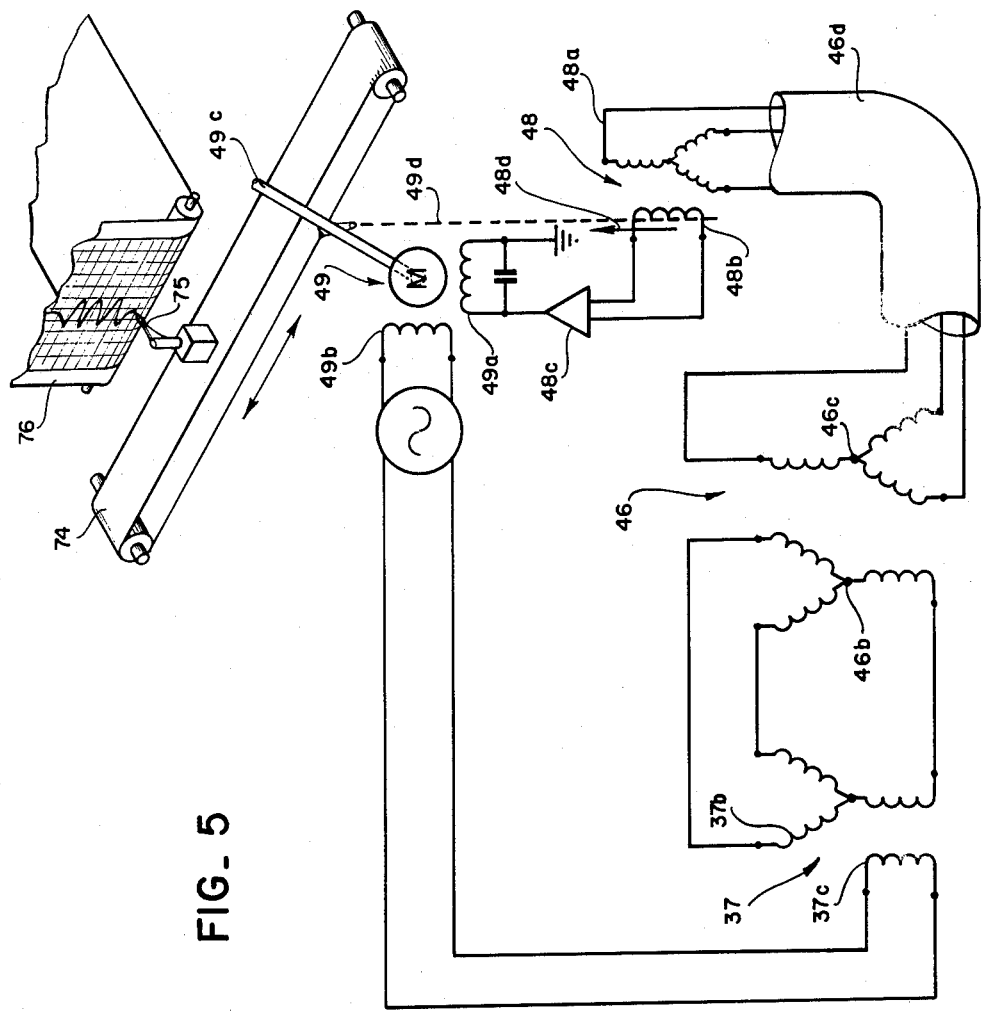
FIGURE 5 is a schematic wiring diagram of a preferred indicating means for the indicator of FIGURE 1.

Generally stated, a preferred embodiment of this invention comprises a first pendulum having two degrees of freedom deflectable in response to the impingement of fluid thereon, apparatus indicating the deflection of the pendulum, and apparatus providing a vertical reference for the pendulum.

More specifically, there is shown in FIGURE 1 a fluid flow indicator 7 comprising a frame including preferably three ground engaging support legs 8 which are connected together at their uppermost terminal ends by a connector plate 9. Legs 8 are pointed at their terminal ends 8a and weights 8b are removably secured to the legs as by bolts. Each leg is provided with a plate 8c adjacent its terminal end which is perpendicular to the longitudinal axis 12 of the flow indicator. A lowering hook 10 extends upwardly from plate 9 and a connector rod 11 extends downwardly from the plate in alignment with the longitudinal axis of the indicator. The longitudinal axis 12 of the flow indicator 7 is in alignment with true vertical when the indicator is standing on a horizontal surface and may properly be called the indicator reference axis.

A cylindrical container 13 is secured by flanges 14a at the top and flanges 14b at the bottom thereof to the support legs 8 by bolt and nut assemblies 15. Container 13 is preferably fluid tight although it may have vent holes in its top and bottom. A pendulum assembly 20 is dependingly suspended from the connector rod 11 and a pendulum assembly 21 is dependingly suspended from the connector rod 13a, which is secured by screws to a mounting plate 13b threadably mounted in the top of the container 13. The direction sensing element 16 of a remote indicating compass is mounted on support 17 within container 13 with its electrical output lead 16a extending through a fluid tight fitting 13c in the container 13 and being connected to a remote indicator (not shown). The remote indicating compass, for example, may be of the type described in the book entitled Aircraft Instruments by George E. Irvin, published by McGraw-Hill, 1944, Second Edition, at page 268.

The pendulum assembly 20 comprises a first rigid connector member 23 best seen in FIGURE 2. Connector 23 has a stem portion 24 and spaced apart parallel flanges 25a and 25b extending therefrom. Stem 24 is preferably provided with two spaced apart through holes 24a and 24b for suspending connector 23 from connector rod 11 in alignment with the reference axis 12, and the flanges 25a and 25b are provided with axially aligned through holes 25c. Needle bearings 25d are mounted in each of the holes 25c and a synchro transmitter 37 having oppositely disposed flanges 37a extending perpendicularly from its casing is bolted to the side of flange 25b by bolts 38 in surrounding relationship to the hole 25c. Synchro 37 has a stator 37b shown schematically in FIGURE 5 fixed to its casing; and a rotor 37c, FIGURE 5, rotatably mounted within the stator. Rotor 37c has a shaft 39 connected thereto which projects from the synchro casing and is rotatably supportingly mounted in the bearings 25d.

The pendulum assembly 20 is provided with a second rigid connector member 26, best seen in FIGURE 3. Connector 26 comprises a stem portion 27 and spaced apart parallel flanges 28a and 28b extending therefrom. Flanges 28a and 28b are provided with axially aligned through holes 28c in which needle bearings 28d are mounted and stem portion 27 has a hole 27a therethrough and a threaded hole 27b intersecting the hole 27a. Connector 26 is pivotally dependingly suspended from between the spaced apart flanges of the connector 23 by the synchro rotor shaft 39 which extends through the hole 27a in the stem 27 of the connector 26. A set screw 27c is threadably mounted in the hole 27b and is engaged with the shaft 39 to fix the connector 26 for rotation with the rotor shaft 39. A synchro transmitter 40 having oppositely disposed flanges 40a extending perpendicularly from its casing is bolted to the side of flange 28a of connector 26 by bolts 41 in surrounding relationship to the hole 28c. Synchro 40 is identical to the synchro 37 and has a stator fixed to its casing and a rotor rotatably mounted within the stator. The rotor of synchro 40 has a shaft 42 connected thereto which projects from the synchro casing and is mounted in the bearings 28d.

The pendulum assembly 20 also includes a pendulum 30, best seen in FIGURE 4, including a threaded pendulum shaft 31 which is flattened at its head end 31a. The end 31a is provided with a hole 31b therethrough which is intersected by the threaded hole 31c. Pendulum shaft 31 is dependingly suspended from between the spaced apart flanges 28a and 28b of the connector 26 on the rotor shaft 42 which extends through the hole 31b in the pendulum shaft head. A set screw 31d is threadably mounted in threaded hole 31c and is tightened into engagement with the rotor shaft 42 to fix the pendulum shaft for rotation therewith. To complete the pendulum 30, a spherical weight or mass 32 having a threaded through hole 32a is adjustably threadably secured to the end of the shaft 31 and is held in a selected position on the shaft by a backup nut 33.

Connector 23 is dependingly suspended from connector rod 11, FIGURE 1, such that its longitudinal axis is in alignment with the indicator reference axis 12. Further, the synchro 37 is mounted in the X axis of the pendulum assembly 20 perpendicular to the reference axis, and the synchro 40 is mounted in the Y axis of the pendulum assembly perpendicular to the X axis, and also perpendicular to the reference axis of the pendulum assembly when the indicator 7 is in an upright position. Pendulum 30 is therefore mounted in alignment with the reference axis 12 for pivotal movement about the X and Y axes of the indicator with two degrees of freedom. As will presently more clearly appear, the synchros 37 and 40 provide means for sensing and indicating the deflection of the pendulum 30 with respect to the reference axis 12.

The components of the pendulum assembly 21 are identical in construction and assembly to the corresponding components of pendulum assembly 20 with the exception that the synchros of pendulum assembly 21 are synchro differential transformers rather than synchro transmitters for a purpose which will presently more clearly appear. For this reason only the principal parts of the pendulum assembly 21 will be generally described.

Pendulum assembly 21, FIGURE 1, comprises a first connector member 43 having a stem and a bifurcated end portion which is rigidly dependingly suspended from connector rod 13a such that its longitudinal axis is in alignment with the reference axis 12. A synchro differential transformer 46, shown schematically in FIGURE 5, having a stator 46b rigid with its case; and a rotor 46c having a shaft connected thereto is mounted on the connector 43 in the X axis of the indicator with the rotor shaft rotatably mounted between the bifurcations of the connector 43. A second connector member 44 having a stem end and a bifurcated end portion is fixedly dependingly suspended from the rotor shaft of synchro 46 for pivotal movement therewith relative to connector member 43 about the X axis of the indicator. A synchro differential transformer 47, identical to the synchro 46, having a stator fixed to its case and a rotor having a shaft connected thereto is connected to the connector 44 in the Y axis of the indicator when the indicator 7 is in an upright position with the rotor shaft thereof rotatably mounted between the bifurcations of connector 44. Pendulum 45 is fixedly dependingly suspended from the rotor shaft of synchro 47 for pivotal movement therewith about the Y axis of the indicator. Accordingly, pendulum 45 of pendulum assembly 21 is therefore mounted in alignment with the reference axis 12 for pivotal movement about the X and Y axes of the indicator with two degrees of freedom.

The synchros of the pendulum assemblies mounted in the X axis and those mounted in the Y axis of the flow indicator operate as identical pairs. For a clearer understanding of this invention, one pair of synchros 37 and 46 and the circuitry associated therewith will be described in detail with reference being made to FIGURE 5. Referring now to FIGURE 5 there is shown in schematic wiring diagram the synchro transmitter 37 comprising synchro rotor 37c and stator 37b. Rotor 37c is connected to a source of A.C. reference voltage, and the stator 37b is connected to the stator 46b of synchro differential 46. The rotor 46c of synchro differential 46 is connected by electrical connector 46d to the stator 48a of a synchro receiver 48. Synchro receiver 48 includes a rotor 48b which is electrically connected through the amplifier 48c to the control winding 49a of a two-phase induction motor 49. The rotor 48b may have an indicator pointer 48d mounted thereon for direct visual observation. For referencing the operation of the motor 49 to that of the synchros 37 and 46, the reference winding 49b of motor 49 is connected to the same A.C. reference voltage as the transmitter rotor 37c. Shaft 49c of motor 49 is connected by mechanical linkage 49d to the rotor 48b to position the rotor 48b in accordance with its own angular position, and is also connected to belt 74 having a stylus 75 mounted for movement therewith relative to continuously moving chart 76. The apparatus including belt 74, stylus 75 and chart 76 may be said to comprise a recorder for automatically recording information indicative of the displacement of pendulum 30 about the X axis in response to the impingement of fluid thereon.

Synchro transmitter 37 and synchro differential 46 each has a zero reference position corresponding to a zero rotor shaft angle with respect to the reference axis 12; and when the rotor shafts of synchros 37 and 46 are in their zero reference positions, the synchro receiver 48 will apply no voltage to the control winding 49a of the motor 49. If, however, the synchro differential rotor 46c is in its zero position and the transmitter rotor 37c is displaced from its zero reference position, a voltage signal indicative of the displacement of the transmitter rotor 37c is applied by the synchro receiver 48 to the control winding 49a of the motor 49 in order to position the motor shaft 49c in accordance with the signal. As the motor shaft 49c is angularly positioned, the linkage 49d positions synchro receiver rotor 48b in accordance with the angular position of the motor shaft to reduce the magnitude of the signal developed in the control winding 49a of the motor 49 to stop the motor 49 when the position of rotor shaft 48b corresponds to that of the transmitter rotor 37c. In a like manner the positioning of the motor shaft 49c also positions the belt 74 such that the stylus 75 is moved relative to continuously moving chart 76 to record the displacement of the motor shaft and consequently the displacement of the synchro transmitter shaft 37c. It will be seen from the foregoing that if the pendulum 30 is rotated about the X axis 15° to the left or 15° to the right of the reference axis 12, as the case may be, for example, and the pendulum 45 is in alignment wtih the reference axis, an error signal will be induced in synchro receiver rotor 48b causing motor shaft 49c to be rotated to an angular position proportional to 15° to the left or 15° to the right, as the case may be. By way of a further example, if the transmitter rotor 37c is rotated 15° to the left and the differential rotor 46b is rotated 5° to the left, the rotor 48b of synchro receiver 48 will be positioned 10° to the left. On the other hand, if the transmitter rotor is rotated 15° to the left and the differential rotor 46c is rotated 5° to the right, then the receiver rotor 48b will be positioned 20° to the left. It will be appreciated from the foregoing that the synchro differential 46 is operative to algebraically subtract from the angle represented by the signal being supplied by the synchro transmitter 37 to the synchro receiver stator 48a in accordance with the angular displacement of its rotor shaft 46c from its zero reference position.

As before mentioned, the synchro transmitter rotor 37c is positioned in accordance with the deflection of pendulum 30 from the reference axis about the X axis in response to impingement of fluid thereon and by gravity when the reference axis 12 is not in alignment with true vertical. Also, the synchro differential rotor 46c is positioned in accordance with the deflection of pendulum 45 from the reference axis 12 about the X axis by gravitational forces when the reference axis is not in alignment with true vertical. Thus, the synchro receiver rotor 48b and the motor shaft 49c are positioned in accordance with the difference in angular position of the two pendulums 30 and 45 about the X axis which is the angle through which the pendulum 30 is rotated in response to the impingement of fluid thereon. In other words, the pendulum 45 provides a vertical reference with respect to which the angular displacement of pendulum 30 is measured in response to the impingement of fluid thereon. The information thus provided is representative of the velocity of fluid acting to rotate the pendulum 30 about the X axis. It will be appreciated that an identical indicating system is provided for determining the deflection of pendulum 30 about the Y axis in response to the impingement of fluid thereon. It will further be appreciated that the direction and velocity of fluid flow may be determined from the information thus collected by vectorial analysis of the deflection of pendulum 30 about both the X and Y axes.

Prior to emplacement of the indicator 7, the container 13 may be filled with a fluid or may be in communication with the fluid medium in which it is immersed by vent holes in the top and bottom thereof. Then the weights 8b are secured in place, if the buoyancy of the indicator requires such, and the indicator is lowered to the bottom of the ocean, for example, by a cable such that the legs 8 thereof are firmly implanted in the ocean floor. If the ocean floor is firm, the terminal ends 8a of the legs being pointed will sink into the floor a short distance; and if the floor is quite soft, the indicator legs will sink into the floor at least up to the flanges 8c at which time the flanges will prevent the further sinking of the indicator, thus providing a stable platform for the indicator. As visual inspection and leveling are not resorted to during the emplacement of the indicator, the indicator may be slightly canted with respect to vertical when emplaced and the azimuth orientation thereof is not known. Therefore, the means indicating the azimuth orientation of the indicator and the means providing a vertical reference for the indicator are provided.

In operation, weight 32 of pendulum 30 being exposed to fluid flow assumes an angular position with respect to the longitudinal reference axis 12 of the indicator frame which is a function of the angular deviation of the indicator frame from true vertical, and additionally assumes a position with respect to the longitudinal reference axis which is a function of the velocity of fluid impinging thereon. The pendulum 45, on the other hand, being encircled by casing 13 assumes a position with respect to longitudinal reference axis 12 of the indicator frame only as a function of the angular deviation of the reference axis 12 from true vertical. The pair of synchros 37 and 46 operative in the X axis of the indicator 7, are connected together such that the output of the synchro 46 represents the angular displacement of the pendulum 30 about the X axis from the vertical reference provided by the pendlum 45, which is the angular deviation about the X axis of the upper pendulum 30 from true vertical. In a like manner, the pair of synchros 40 and 47 operative in the Y axis are connected together such that the output of synchro 47 represents the angular displacement of the pendulum 30 about the Y axis from the vertical reference provided by the pendulum 45, which is the angular deviation about the Y axis of the upper pendulum 30 from true vertical. The synchro receivers which are connected to the synchros 46 and 47 are therefore automatically positioned in an amount representative of the angular deviation of the pendulum 30 from true vertical in response to the impingement of fluid thereon. The synchro receivers in turn operate recorders which store the information for later analysis.

It will be appreciated that the voltage signal representative of the deflection of pendulum 30 about the X and Y axes is insufficient for complete automatic data transmission unless the direction of fluid flow is known or the orientation of the indicator with respect to a reference such as North is known. Accordingly, the remote indicating compass 16 is provided and preferably oriented such that its fiducial reference is in alignment with the X axis of the pendulum assemblies and the indicator. It will be seen therefore that the remote indicating compass provides a means for referencing the movement of the pendulum 30 about the X and Y axes with respect to a North datum such that the true direction of fluid flow with respect to that datum may be ascertained. The remote indicating compass may be read upon emplacement of the indicator 7 and at intervals thereafter or may be connected to recording means of the type disclosed in FIGURE 5, for example, so that if the indicator frame shifts slightly about its vertical axis after emplacement such shift will be indicated whereby the fluid direction readings may be accordingly corrected.

It will further be appreciated that if the indicator frame shifts slightly, angularly about its longitudinal reference axis during normal operation, that the pendulum assembly 21 will automatically compensate the pendulum assembly 20 for such shift. Further, the pendulum assembly 21 will compensate for an angular deviation of the indicator frame in the preferred embodiment of the invention up to in the order of 30°.

From the foregoing it will be seen that this invention provides an accurate means for automatically indicating the direction and velocity of fluid currents which need not be precisely emplaced. However, it is to be understood that it is within the contemplation of this invention that an indicator constructed in accordance with the principles of this invention is capable of emplacement by visual inspection. If such a mode of operation were selected, the remote indicating compass and the pendulum assembly 21 providing a vertical reference for the pendulum assembly 20 could be dispensed with, for the indicator could be emplaced with the longitudinal reference axis 12 in alignment with true vertical and the azimuth orientation of the indicator frame could be determined at the time of its emplacement. Further, if the direction of fluid flow is known and constant, the pendulum 30 need only have one degree of freedom. It is further contemplated that sensing means such as potentiometers, for example, could be used in lieu of synchros to indicate the deflection of pendulum 30 in response to fluid impinging thereon, although synchros are preferred.

Generally stated, an alternate embodiment of this invention comprises a first floatable pendulum having two degrees of freedom, apparatus indicating the deflection of the pendulum in response to the impingement of fluid thereon and a second pendulum having two degrees of freedom connected to the first pendulum to provide a vertical reference for the first pendulum.

More specifically, there is shown in FIGURE 6 the fluid flow indicator 50 comprising a frame including three support legs 51 each provided with a plate 51a adjacent its terminal end. Legs 51 are connected together at the top terminal end by a connector plate 52 having a lifting hook 53 extending upwardly therefrom. A cylindrical container 54 preferably having openings in its top and bottom is provided with flanges 55a at the top portion thereof and flanges 55b at the bottom thereof, whereby the container is supported from the legs 51. For indicating the azimuth orientation of the indicator frame, the sensing element 54a of a remote indicating compass is mounted within container 54. The longitudinal axis 69 of the indicator 50 is in alignment with true vertical when the indicator is standing on a horizontal surface and may properly be called the indicator reference axis.

A U-shaped mounting member 56 is supported from the top of container 54 by L-shaped connectors 57, and a member 58 having an elongate slot 59 therethrough is pivotally mounted between the spaced apart legs of the U-shaped member 56 on opposed aligned pins 60. Pendulum 61 having a pendulum shaft 61a, a weight or mass 62 threadably secured to its bottom terminal end and a bifurcated end portion 63 at the other end thereof is pivotally mounted within the slot 59 on pin 58a. The pendulum 61 is therefore mounted or gimballed with two degrees of freedom with respect to the reference axis 69. Since the weight 62 is surounded by casing 54, it is not influenced by the fluid flow of the medium in which the indicator is immersed; therefore, the pendulum 61 assumes a true vertical reference position which position is not influenced by the orientation of the indicator frame.

The bifurcated end portion 63 of pendulum 61 has axially aligned holes 63a in the spaced apart flanges thereof and a synchro 64 having flanges extending from its casing is mounted in surrounding relationship to the through hole 63a. Synchro 64 has a stator fixed to its casing and a rotor rotatably mounted within the stator. The rotor has a shaft 64a which projects from the synchro casing and is mounted in the bearings within through holes 63a. A connector member 65 having spaced apart flanges 67a and 67b and a stem end 66 having a hole therethrough is fixedly connected to the rotor shaft 64a for pivotal movement therewith relative to the bifurcated end portion 63. Synchro transmitter 68 having a stator fixed to its casing and a rotor rotatably mounted therein is secured to the flange 67b such that the rotor shaft 68a thereof is rotatably supported by the flanges 67a and 67b. Pendulum 70 having a flattened head end 71 with a hole therethrough and a floatable pendulous mass or weight 72 threadably adjustably secured to the end thereof is fixedly secured by its head end to the rotor shaft 68a for pivotal movement therewith relative to the connector 65. For indicating the angular position of the rotors of the synchro transmitters 64 and 68, the synchro transmitters are each preferably electrically connected to a synchro receiver and a recorder of the type disclosed in FIGURE 5.

The indicator 50 is emplaced on the floor of a body of water in a manner identical to the emplacement of the indicator 7. In operation, the pendulum 61 being gimballed and encased by casing 54 assumes a true vertical position thus providing a vertical reference with respect to which the floatable pendulum 70 is displaced in response to the impingement of fluid thereon. Pendulum 70 being gimballed with respect to pendulum 61 on the shafts of synchro rotors 64 and 68 therefore position the rotors of synchros 64 and 68 as a function of its displacement from true vertical. The outputs from the synchros 64 and 68 are therefore indicative only of the displacement of the pendulum 70 about the X and Y axes in response to the impingement of fluid thereon, which may be recorded without correction. It will be appreciated that the sensitivity of the indicator 50 may be varied simply by adjusting the floatable weight 72 along the pendulum shaft or by replacing the floatable weight by a different floatable weight.

It will further be appreciated from the foregoing that it is within the scope of this invention that the pendulum 70 could be gimballed with respect to the shaft of pendulum 61 by a mounting identical to that interconnecting pendulum 61 and container 54.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

I claim:

1. An indicator comprising: a frame having a longitudinal reference axis, and X and Y axes perpendicular thereto; a first pendulum assembly exposed to fluid flow mounted in alignment with said reference axis including a first connector member fixedly secured to said frame, a second connector member connected to said first connector member for pivotal movement about the X axis, a first synchro transmitter for sensing pivotal movement of said second connector member relative to said first connector member, a pendulum connected to said second connector member for pivotal movement about the Y axis, a second synchro transmitter for sensing pivotal movement of said pendulum about the Y axis relative to said second connector member; a second pendulum assembly mounted in alignment with said reference axis including a third connector member fixedly secured to said frame, a fourth connector member connected to said third connector member for pivotal movement about the X axis, a first synchro differential for sensing pivotal movement of the fourth connector about the X axis relative to said third connector member, a second pendulum connected to said fourth connector member for pivotal movement about the Y axis, a second synchro differential for sensing pivotal movement of said second pendulum about the Y axis relative to said third connector member; means mounted on said frame to protect said second pendulum assembly from movement due to fluid flow; and a first and second synchro receiver, said first synchro differential being electrically connected to said first synchro transmitter and to said first synchro receiver for indicating the deflection of said first pendulum about the X axis in response to the impingement of fluid thereon and said second synchro differential being electrically connected to said synchro transmitter and to said second synchro receiver for indicating the deflection of said first pendulum about the Y axis in response to the impingement of fluid thereon.

2. The combination of claim 1 including a recording means connected to each of said first and second synchro receivers.

3. A fluid direction and velocity indicator particularly adapted for blind emplacement in a flowable liquid medium comprising: a frame means having a vertical axis; a first pendulum assembly gimbally suspended from said frame and exposed to be freely movable upon the occurrence of a liquid medium flow; a second pendulum assembly gimbally suspended from said frame; means mounted on said frame to protect said second pendulum assembly from movement due to liquid flow; a first signal generating and transmitting means for presenting a signal indicating the positional relationship of said first pendulum assembly relative to said frame means vertical axis; and a second signal generating and transmitting means for presenting a signal indicating the positional relationship of said second pendulum assembly relative to said frame means vertical axis; said second pendulum assembly positional signal relative to the frame means vertical axis establishing a true vertical reference for adjusting said first pendulum assembly positional signal to indicate the true extent of liquid medium flow reaction on said first pendulum assembly regardless of the positional attitude of said frame.

4. The combination of claim 3 including means indicating the azimuth orientation of said frame means.

5. The combination of claim 3 including a recording means connected to each of said first and second signal generating and transmitting means.

6. A fluid direction and velocity indicator particularly adapted for blind emplacement in a flowable liquid medium comprising: a frame means having a vertical axis; a first pendulum assembly that is floatable and gimbally mounted to said frame and exposed to be freely movable upon the occurrence of a liquid medium flow; a second pendulum assembly gimbally suspended from said frame; means mounted on said frame to protect said second pendulum assembly from movement due to liquid flow; a first signal generating and transmitting means for presenting a signal indicating the positional relationship of said first pendulum assembly relative to said frame means vertical axis; and a second signal generating and transmitting means for presenting a signal indicating the positional relationship of said second pendulum assembly relative to said frame means vertical axis; said second pendulum assembly positional signal relative to the frame means vertical axis establishing a true vertical reference for adjusting said first pendulum assembly positional signal to indicate the true extent of liquid medium flow reaction on said first pendulum assembly regardless of the positional attitude of said frame.

References Cited by the Examiner

UNITED STATES PATENTS

| | | | |
|---|---|---|---|
| 1,861,692 | 7/32 | Gerdes | 33—220 |
| 2,347,443 | 4/44 | Vesely | 248—156 |
| 2,399,960 | 5/46 | Turner | 248—156 |
| 2,592,583 | 4/52 | Lyon | 73—189 |
| 2,770,129 | 11/56 | Dalzell | 73—188 |
| 2,913,900 | 11/59 | Andrews | 73—189 |
| 2,942,864 | 6/60 | Sikora | 73—504 X |

FOREIGN PATENTS 1,249,999  11/60  France.

RICHARD C. QUEISSER, *Primary Examiner.*

JOSEPH P. STRIZAK, *Examiner.*